(12) United States Patent
Roos (10) Patent No.: US 9,954,421 B2
(45) Date of Patent: Apr. 24, 2018

(54) ELECTRICAL MACHINE, IN PARTICULAR ELECTRIC MOTOR FOR A MOTOR VEHICLE, AND GEARBOX ACTUATOR

(71) Applicant: BROSE FAHRZEUGTEILE GMBH & CO. KOMMANDITGESELLSCHAFT, WUERZBURG, Wuerzburg (DE)

(72) Inventor: Stephan Roos, Wertheim-Hoehefeld (DE)

(73) Assignee: Brose Fahrzeugteile GmbH & Co. Kommanditgesellschaft, Wuerzburg, Wuerzburg (DE)

(*) Notice: Subject to any disclaimer, the term of this patent is extended or adjusted under 35 U.S.C. 154(b) by 159 days.

(21) Appl. No.: 15/055,812

(22) Filed: Feb. 29, 2016

(65) Prior Publication Data

US 2016/0254731 A1 Sep. 1, 2016

(30) Foreign Application Priority Data

Feb. 27, 2015 (DE) .......... 10 2015 002 562

(51) Int. Cl.
| | | |
|---|---|---|
| H02K 11/00 | (2016.01) | |
| H02K 21/12 | (2006.01) | |
| G01D 5/14 | (2006.01) | |
| H02K 11/215 | (2016.01) | |
| H02K 7/00 | (2006.01) | |

(52) U.S. Cl.
CPC .......... *H02K 11/215* (2016.01); *H02K 7/003* (2013.01)

(58) Field of Classification Search
CPC .............................. H02K 11/00; H02K 29/00
USPC .......... 310/68 B, 156.08, 156.11; 324/207.2, 324/207.25
See application file for complete search history.

(56) References Cited

U.S. PATENT DOCUMENTS

| 2008/0272660 A1 | 11/2008 | Becker et al. |
| 2011/0181221 A1 | 7/2011 | Asahi et al. |

FOREIGN PATENT DOCUMENTS

| DE | 8811966 U1 | 7/1989 |
| DE | 102005062784 A1 | 7/2007 |
| DE | 102006032780 A1 | 1/2008 |
| DE | 102008040318 A1 | 1/2010 |
| JP | 2014183674 A * | 9/2014 |

* cited by examiner

*Primary Examiner* — Jose Gonzalez Quinones
(74) *Attorney, Agent, or Firm* — Laurence A. Greenberg; Werner H. Stemer; Ralph E. Locher (57) ABSTRACT

An electrical machine is particularly suited as an electric motor of a motor vehicle. The machine has a rotor mounted rotatably by way of a rotor shaft and a position emitter with a rotationally fixed sensor unit and with a sensor emitter fixed relative to the rotor shaft. The emitter is an injection molding with an emitter head receiving a magnet, in particular a magnetic dipole, and with a joint shank. Alternatively, it is provided, together with the magnet on the emitter head side, with an plastic over-molding forming the joint shank. The joint shank is joined to the rotor shaft on the face side of a shaft end by form fit, forming a press fit or an interference fit.

11 Claims, 6 Drawing Sheets

ELECTRICAL MACHINE, IN PARTICULAR ELECTRIC MOTOR FOR A MOTOR VEHICLE, AND GEARBOX ACTUATOR

CROSS-REFERENCE TO RELATED APPLICATION

This application claims the priority, under 35 U.S.C. § 119, of German patent application DE 10 2015 002 562.7, filed Feb. 27, 2015; the prior application is herewith incorporated by reference in its entirety.

BACKGROUND OF THE INVENTION

Field of the Invention

The invention concerns an electrical machine, in particular of a motor vehicle, with a rotor mounted rotatably by means of a rotor shaft and with a position emitter with a rotationally fixed sensor unit and with a sensor emitter fixed relative to the shaft. It furthermore concerns a gearbox actuator of a motor vehicle with such an electrical machine. The term "electrical machine" here means in particular a brushless electric motor (DC motor) or a synchronous machine, but also an alternator.

In at least partly automatic transmissions of motor vehicles, the individual selection stages (gears) are selected by way of a gearbox actuator. For this, the gearbox actuator has a so-called shift finger and an electric motor, wherein the shift finger can be moved by the electric motor and wherein the position of the shift finger determines the desired translation ratio.

Normally, a brushless electric motor with a permanently excited rotor and a stator, powered by electronics, is used as an electric motor. The electronics comprise a number of semiconductor components connected in a bridge circuit. The bridge circuit is conventionally a B6 circuit and the stator has three field windings which are connected either in a delta or a star circuit. To shield and prevent any damage to the field windings, the stator is arranged in a stator housing.

To guarantee proper function of the gearbox actuator, it is necessary for the field windings to be powered precisely. For this, knowledge of the angular position of the rotor relative to the stator is required. Normally, after mounting of the electric motor, a dipole magnet is glued to a shaft end of the rotor. For this, tolerances must be observed and space reserved. Furthermore, the gearbox actuator and consequently also the electric motor must be free from foreign particles, such as adhesive residue. Therefore the electric motor is cleaned after fixing of the magnets. Since the magnet can only be glued to the shaft after the end of installation of the electric motor, and a certain time is required for the adhesive to set, a comparatively long time period is required for producing the gearbox actuator.

An electric motor known from German published patent application DE 10 2006 032 780 A1 has a rotary emitter sensor element arranged on the stator side and a rotary emitter arranged on the rotor side. Such rotor emitters/rotary emitter sensor elements are for example Hall sensors. The rotary emitter is arranged in an opening in the face of the rotor shaft and integrally connected thereto. This means that the permanent magnet is produced inside the opening. The opening is formed as a blind hole and is on the side of a B-bearing plate of the electric motor. In a preferred embodiment, a sleeve is arranged inside the opening of the rotor shaft, inside which sleeve the permanent magnet is located.

German published patent application DE 10 2004 059 181 A1 discloses an electrical machine with a rotary emitter based on the Hall principle, wherein an emitter element is arranged in a face-side recess of a shaft. The recesses are situated on the side of a B-side bearing plate. The opening is formed as a blind hole.

German published patent application DE 102 58 036 A1 discloses a worm gear of a screen wiper device with a worm wheel. The output shaft of the worm wheel has a shell-like recess, inside which a position determination element is hot-pressed. The position is determined preferably by means of a Hall sensor. For production, the worm wheel is produced with the drive shaft and receiver in which the position determination element is inserted and attached.

SUMMARY OF THE INVENTION

It is accordingly an object of the invention to provide an electrical machine which overcomes the above-mentioned and other disadvantages of the heretofore-known devices and methods of this general type and which provides for a particularly suitable electrical machine, a particularly suitable gearbox actuator and a particularly suitable method for production of the electrical machine, in which the production time of the electrical machine is shortened.

With the foregoing and other objects in view there is provided, in accordance with the invention, an electrical machine, comprising:

a rotor rotatably mounted about a rotor shaft, the rotor shaft having a shaft end with a face side;

a position emitter with a rotationally fixed sensor unit and with a sensor emitter fixed relative to the rotor shaft;

the sensor emitter being an injection molding formed with an emitter head receiving a magnet and with a joint shank; or being provided, together with the magnet on the emitter head side, with an plastic over-molding forming the joint shank; and the joint shank being joined to the rotor shaft on the face side of the shaft end by form fit, forming a press fit or interference fit.

For this, the electrical machine, or the electric motor of a motor vehicle, has a rotor mounted rotatably on a rotor shaft and fixed relative to the shaft, and a position emitter with a rotationally fixed sensor unit and with a sensor emitter fixed relative to the shaft, which is configured as an injection molding with an emitter head receiving a magnet, in particular a dipole magnet, and with a joint shank, or is provided, together with the magnet on the emitter head side, with a plastic over-molding in the region of the joint shank, wherein the joint shank is connected to the rotor shaft on the face side of a shaft end, in particular the B-side shaft end, by form fit, forming a press fit or interference fit. In other words, the sensor emitter is configured as a plastic injection molding with the magnet, in particular the magnetic dipole, and the plastic over-molding is joined to the rotor shaft by means of a form-fit connection in the axial and/or radial direction.

The invention is based on the consideration that, over the service life and taking into account the temperature range usually to be considered in the automotive sector (approximately from −40° C. to 160° C.), firstly the signal emitter can be held as free from adhesive as possible, and secondly it can be held axially and radially reliably and secure against twisting relative to the rotor shaft (axis of machine, motor and rotor) on the intended faces of the rotor shaft, if both a form-fit and an additional friction-fit connection to the corresponding shaft end of the rotor shaft are created using a suitable substance or material component of the sensor emitter. This in turn can be achieved easily and particularly economically if the sensor emitter, at least superficially, comprises a material component which is soft or elastic or flexible in comparison with the material of the rotor shaft. In this respect, a plastic over-molding of a corresponding emitter joint part, including the emitter itself in the form of a magnet (dipole magnet), is particularly suitable. However, the sensor emitter may also be configured as a whole as an injection molding with embedded magnet.

In both variants, namely the plastic over-molding or plastic injection molding variants, an emitter head containing the magnet and a joint shank connected thereto by form fit or molded thereon is produced, which, because of the at least slight deformability of at least its surface, allows production of a joint fit in the form or manner of a press fit in addition to the form-fit connection.

The joint shank of the signal emitter may be configured, in relation to the shaft end of the rotor shaft constituting the joint shank, as a push-in molding, a push-on molding or a combined push-in and push-on molding. A suitable push-in molding is advantageously a stepped contour with a comparatively large and a comparatively small outer diameter of two shank portions of the joint shank connecting axially to the emitter head. In this variant, suitably, a stepped bore with at least two different internal diameters is made in the rotor shaft on the shaft end side.

An advantageous embodiment of this push-in variant provides that, in the shank region with the comparatively large outer diameter, the joint shank has on the outside deformable ribs to create the press fit inside the corresponding shaft-side bore portion of the stepped bore. Alternatively, in this region a knurling may be made in the stepped bore on the inner wall side, which in the joint connection penetrates at least slightly into the plastic surface of the joint shank on the sensor side.

According to a refinement of the push-in variant, a ring disk—also designated below as a claw disk—is provided with an internal opening through which, in the joined state, passes the shank region of the joint shank with the comparatively small outer diameter. Because of the comparatively soft plastic material, i.e. deformable relative to the rotor shaft and ring disc, of the sensor emitter in the region of the joint shank, the ring disc grips into the corresponding shank portion of the joint shank on the sensor side, so that the sensor emitter is secured against twisting relative to the ring disc.

In conjunction with a preferably definedly rough inner face of the stepped bore on the shaft side, the ring disc sits inside the stepped bore and the joint shank of the sensor emitter inside the ring disc securely against rotation, so that the sensor emitter is held rotationally securely in the joint connection. In addition, the joint shank on the emitter side may be provided with deformable radial ribs in the stepped region with the comparatively large outer diameter, in order to improve the twist-secure press fit of the sensor emitter in the stepped bore.

In the push-on variant, the joint shank of the sensor emitter suitably has a joint sleeve which surrounds the shaft end of the rotor shaft in the manner of a cap, with a joint opening facing away from the emitter head, and has a number of deformable radial lips on the inside.

According to an advantageous refinement of this push-on variant, a joint contour on the shaft end side is provided in the form of a single bore and a joint peg on the sensor side inside the joint sleeve, so that a ring chamber is formed inside the joint sleeve of the sensor-side joint shank. This provides a particularly suitable combined push-in and push-on variant.

A suitable embodiment of the combined push-in and push-on variant provides that the joint peg of the sensor-side joint shank has on the periphery deformable radial ribs extending into the ring chamber towards the joint sleeve. Additionally or alternatively, the shaft end may have a knurling on its outer periphery. The radial ribs, in addition to the press fit formation, increase the concentricity of the sensor emitter to the shaft axis (shaft center) of the rotor shaft on production of the joint connection, and maintain this over the service life.

The benefits achieved with the invention lie in particular in that, in addition to the reliably and easily created joint connection of the plastic part or plastic over-molded sensor emitter on the face side of the intended shaft end with that of the rotor shaft, the axial production tolerances can be compensated easily and reliably. For this, the sensor emitter or its joint shank is not pushed into or onto the shaft face end as far as the stop, but because of the emitter design, to create the reliable and secure joint connection taking into account the required axial shaft mass, it can be pushed axially onto the shaft end of the rotor shaft on the face side without contact on the shaft side.

Other features which are considered as characteristic for the invention are set forth in the appended claims.

Although the invention is illustrated and described herein as embodied in electrical machine, in particular electric motor for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

Corresponding parts are identified with the same reference numerals throughout the figures of the drawing.

DETAILED DESCRIPTION OF THE INVENTION

Figure 1:
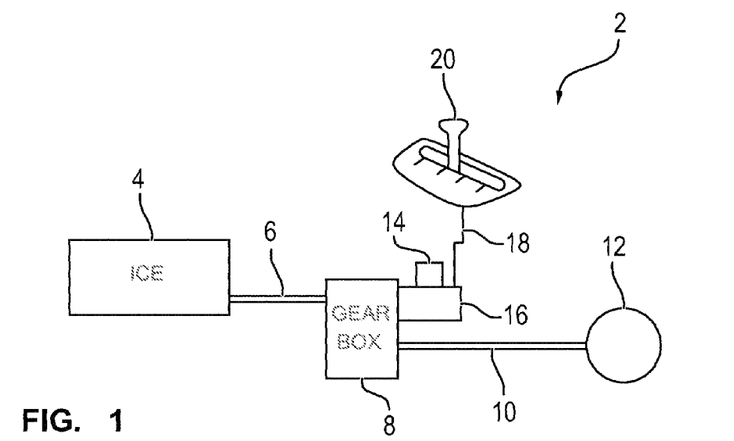
FIG. 1 shows in simplified diagrammatic form, a drive train of a motor vehicle with a gearbox actuator.

Referring now to the figures of the drawing in detail and first, particularly, to FIG. 1 thereof, there is shown a diagram of a drive train 2 of a motor vehicle. An internal combustion engine (ICE) 4 is actively connected to drive wheels 12 via a first shaft 6, a gearbox 8, a second shaft 10 and a non-illustrated differential. Here, the rotational movement of the first shaft 6, driven directly by the internal combustion engine 4, is converted into a rotational movement of the drive wheels 12, wherein both the direction of rotation and the rotation speeds differ. Because of the differential, the rotational movement takes place substantially at a right angle to the rotational movement of the second shaft 10.

A specific translation ratio between the first shaft 6 and the second shaft 10 is determined by way of the gearbox 8. Furthermore, the direction of rotation of the second shaft 10 is set by way of the gearbox 8. For this, the gearbox 8 has a number of so-called selection stages which are selected by way of a gearbox actuator 16 comprising an electric motor 14. For this, the electric motor 14 drives a moveable part of the gearbox actuator 16 which in turn is actively connected to a selection mechanism of the gearbox 8. The gearbox actuator 16 furthermore comprises control electronics (not shown), referred to below as electronics, which control the electric motor 14 and are adjusted by a selector lever 20 via a data line 18, for example a CAN bus. By means of the selector lever 20, a driver can select the movement direction of the motor vehicle.

Figure 2:
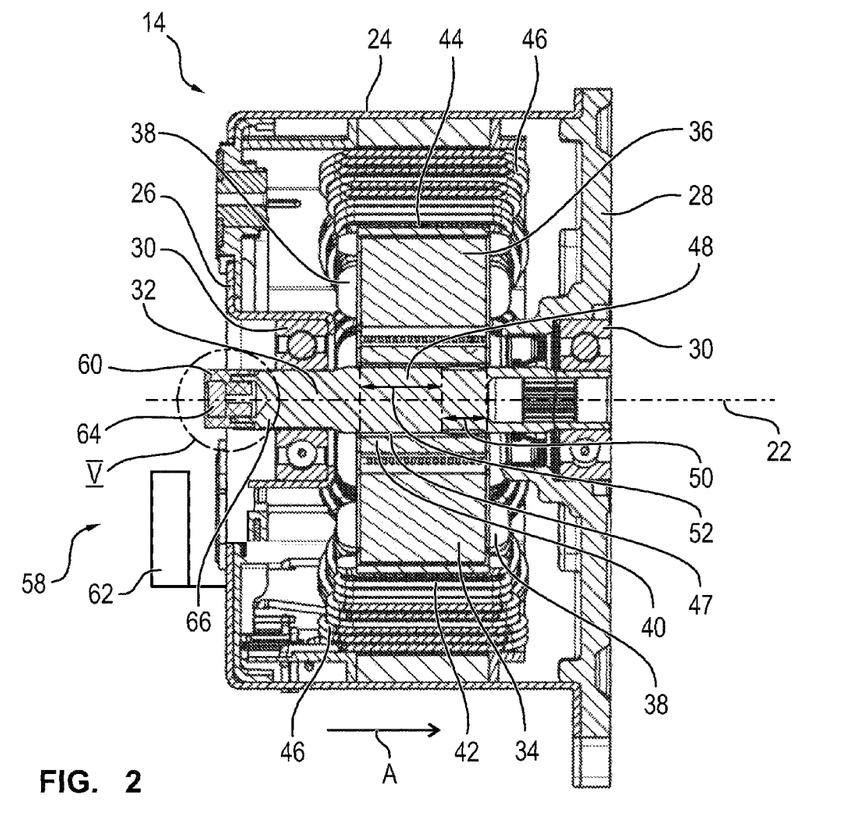
FIG. 2 shows an electric motor in a cross-section view, with a sensor emitter joined to a motor shaft on the shaft end side.

In FIG. 2, the electric motor 14 is shown in a cross-section view along its motor or rotor axis 22. The electric motor 14 has a pot-shaped housing 24, the pot base of which forms a B-bearing plate 26. The housing 24 is closed by means of an A-bearing plate 28, wherein a ball bearing 30 is mounted centrally on each bearing plate 26, 28. By means of the bearing 30, a shaft (motor shaft) 32 of a rotor 34 is mounted rotatably about the rotor axis 22. The rotor 32 has a rotor packet 36 arranged inside the housing 24 and connected to the shaft 32. The rotor packet 36 comprises a number of permanent magnets 38 which are positioned inside a sheet packet 40, symmetrically relative to the rotor axis 22. For this, the sheet packet 40, comprising individual sheets electrically isolated from each other and stacked on each other in the axial direction A, has corresponding recesses (magnet pockets) which extend in the axial direction A, i.e. parallel to the rotor axis 22.

On the periphery, the rotor packet 36 surrounds a stator 42, wherein the two are spaced apart by means of an air gap 44. The stator 42 has a number of electric magnets 46 which are attached to the inner wall of the housing 24. The electric magnets 46 are themselves controlled by means of the control electronics (not shown in detail) connected to the B-bearing plate 26. A housing of the gearbox 8 is connected to the A-bearing plate 28, within which housing the individual gear stages are arranged.

The rotor packet 36 has a central recess 47 in which a contact region 48 of the shaft 32 is pressed. The rotor packet 36 lies on the contact region 48 which consists of a first portion 50 and a second portion 52. The first portion 50 here forms the end of the contact region 28 facing the A-bearing plate 28, while the second portion 52 forms the end of the contact region 28 facing the B-bearing plate 26. The rotor packet 36 is in direct mechanical contact only with the contact region 48 of the shaft 32.

The shaft 32 is formed so as to be substantially cylindrical. The first portion 50 has a first outer diameter 54 and the second portion 52 has a second outer diameter 56. The first outer diameter 54 corresponds to the second outer diameter 56, wherein the second outer diameter also corresponds to the inner diameter of the second portion 52. In other words, the surface of the second portion 52 is smooth and structureless. Also, the cross section of the second portion 52 perpendicular to the rotor axis 22 is a circle, the center point of which lies on the rotor axis 22. The first portion 50 is knurled so that its inner diameter is smaller than the first outer diameter 54. Consequently, the circumference of the first portion 50 is enlarged. The length of the first portion 50 in the axial direction A amounts to one-third of the length of the second portion 52 in the axial direction A. In other words, the second portion 52 in the axial direction A is three times as long as the adjacent first portion 50.

The electric motor 14 furthermore comprises a position emitter 58 with a sensor emitter 60 and with a sensor unit 62. The sensor unit 62 is connected rotationally fixedly to the B-bearing plate 26 or to an electronics housing part (FIG. 14), and comprises a Hall sensor for measuring a changing magnetic field. For this, the Hall sensor as a sensor unit 62 is coupled to the electronics for signaling and is powered thereby.

The sensor emitter 60 comprises a magnetic dipole, designated below as a magnet or dipole magnet 64, the magnetic field of which is detected by means of the sensor unit 62. The dipole magnet 64 is joined to a shaft end 66 of the motor shaft 32 on the face side thereof by form-fit and in the manner of an interference fit or press fit, so that the sensor emitter 60 is connected to the shaft 32 fixed relative thereto (i.e., rotationally fixed). By means of the sensor unit 62, the angular position of the sensor emitter 64 relative to the rotor axis 22 is determined and transmitted to the electronics. The detected position is determined in order to determine the angular position of the shaft 32 and consequently also the position of the rotor-side permanent magnet 38. Using the position data, the stator-side solenoids 46 are powered. In this way, a comparatively quiet running of the electric motor 14 is achieved.

Figures 3, 4, 5:
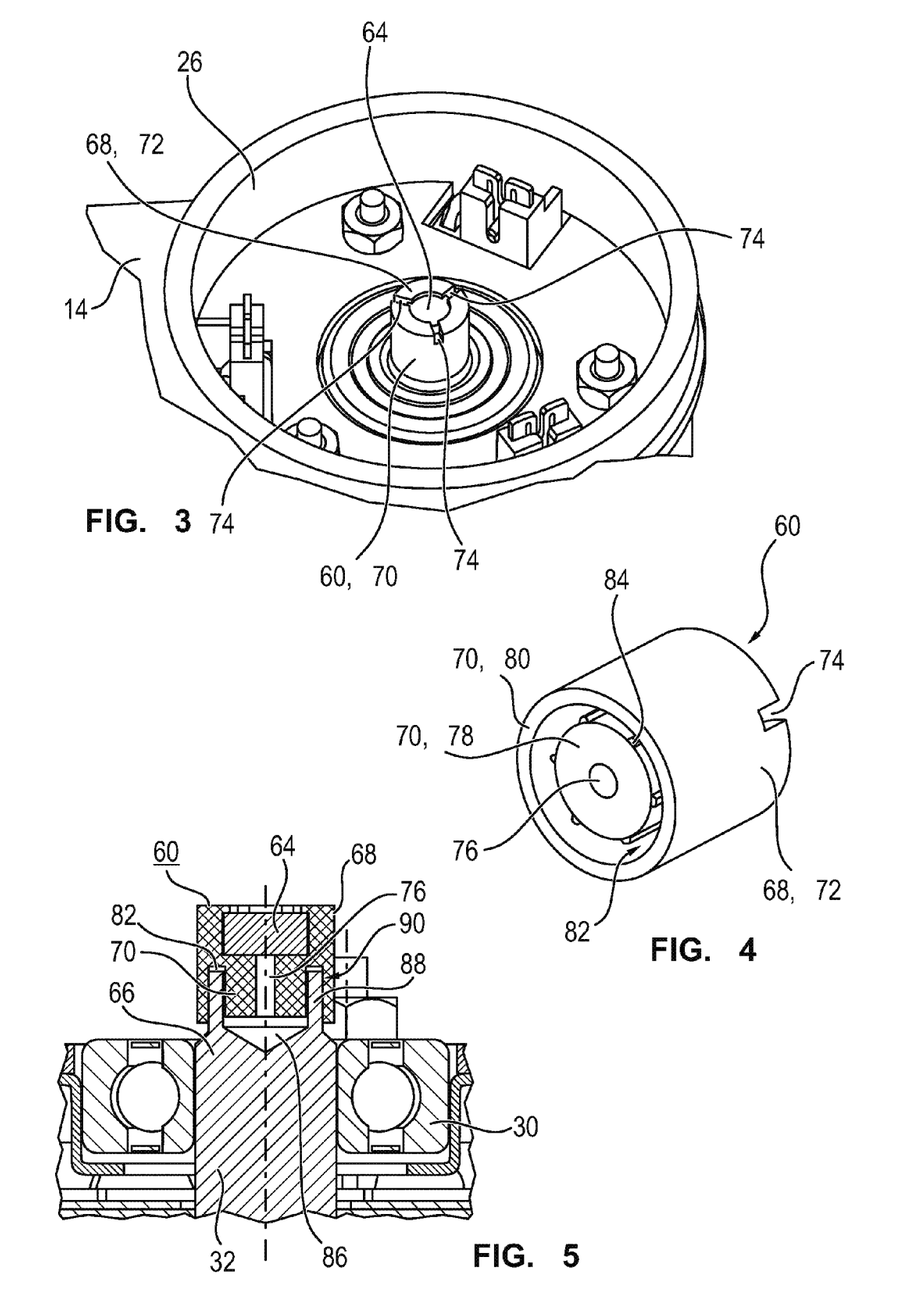
FIG. 3 is a perspective view of the electric motor with a view into its B-side bearing plate, of the sensor emitter joined on the shaft end side.
FIG. 4 shows in perspective view, an embodiment of a joint shank of the sensor emitter on the emitter side, as a combined push-on and push-in joint part with plastic over-molding.
FIG. 5 shows an extract marked V from FIG. 2 in enlarged scale with sensor emitter joined on the shaft end side.

FIG. 3 shows the electric motor 14 with a view onto the B-side bearing plate 26 and onto the sensor emitter 60 protruding axially therein. In the region of the emitter head 68, the preferably non-round magnetic dipole 64 is held rotationally stationary and by form fit by the plastic over-molding 72, in that the over-molding 72 surrounds the magnetic dipole 64 on the face side in the manner of a collar. There, three grooves or beads 74 are made in the over-molding 72 on the face side, as a holding structure in the over-molding 72. The magnetic dipole 64 can be held in the plastic injection molding tool together with a central axial opening (hole) 76, shown in FIGS. 4 and 5, as a further holding structure in a joint or centering peg 78 of the joint shank 70.

As comparatively clearly evident from FIGS. 4 and 5, the joint shank 70 of the sensor emitter 60 has a cap-like joint sleeve 80, inside which the joint peg 78 is molded to form a ring chamber 82. The joint peg 78 has on the periphery deformable radial ribs 84 extending into the ring chamber 82.

In mounting state, the joint or centering peg 78 of the sensor emitter 60 engages in an axial shaft bore (axial bore) 86 made on the face end of the shaft end 66 of the rotor shaft 32. At the same time, the joint sleeve 80 surrounds the bore edge 88 of the shaft end 66 in the manner of a cap, so that the sensor emitter 60 sits in the face end of the rotor shaft 32 on the shaft end 66 by form fit with the joint shank 78 and sits thereon by form fit with the joint sleeve 80. Preferably, the centering peg 78 is designed more solidly than the joint sleeve 80, so that the joint or centering peg 78 clearly defines the centering direction. By means of the radial ribs 84 of the joint peg 78, the form-fit joint connection also forms a press fit, and allows an axial press-fit dimension on pressing in. Also, suitably, the shaft end 66 is provided on the periphery with knurling 90, preferably a cross-cut.

During assembly of the sensor emitter 60 designed as a push-in and push-on variant, the joint sleeve 80 configured as a plastic over-molding 72 is pushed onto the knurling 90 of the shaft end 6 and there suitably radially hot-pressed. Also during hot pressing, plastic or over-molding material is pressed into the knurling 90, whereby an axial form-fit joint connection is created between the sensor emitter 60 and the shaft end 66. Also, during the hot pressing of the over-molding 72, material can flow axially behind the knurling 90, which further improves the axial form-fit joint connection.

Figure 6:
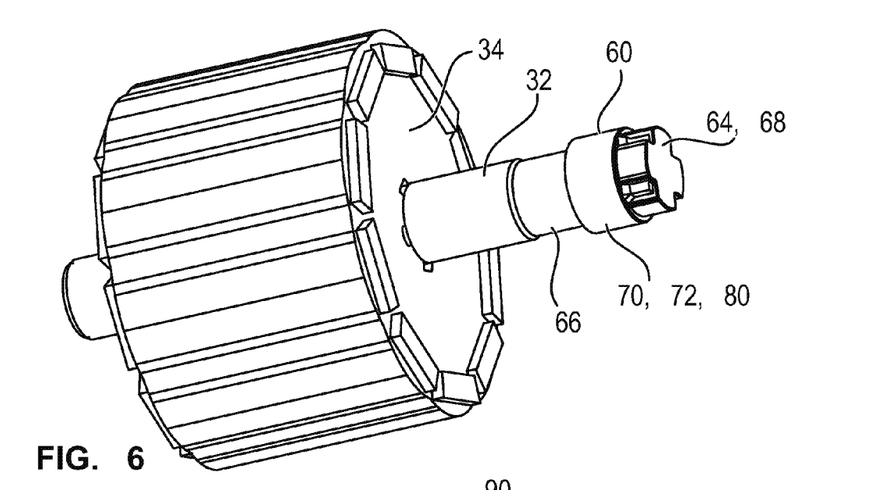
FIG. 6 shows in perspective view, the rotor of the electric motor with sensor emitter joined on the shaft end side, as a push-on joint part with plastic over-molding.

FIGS. 6 to 9 show a pure push-on variant of the sensor emitter 60. FIG. 6 shows the rotor 34 with the sensor emitter 60 pushed onto the shaft end 66 of the rotor shaft 32 by form fit, forming a press fit. Its joint shank 70, again formed as a joint sleeve 80, is configured as a plastic injection molding in the form of the plastic over-molding 72 of the magnetic dipole 64 inside the sensor head 68.

Figures 7, 8, 9:
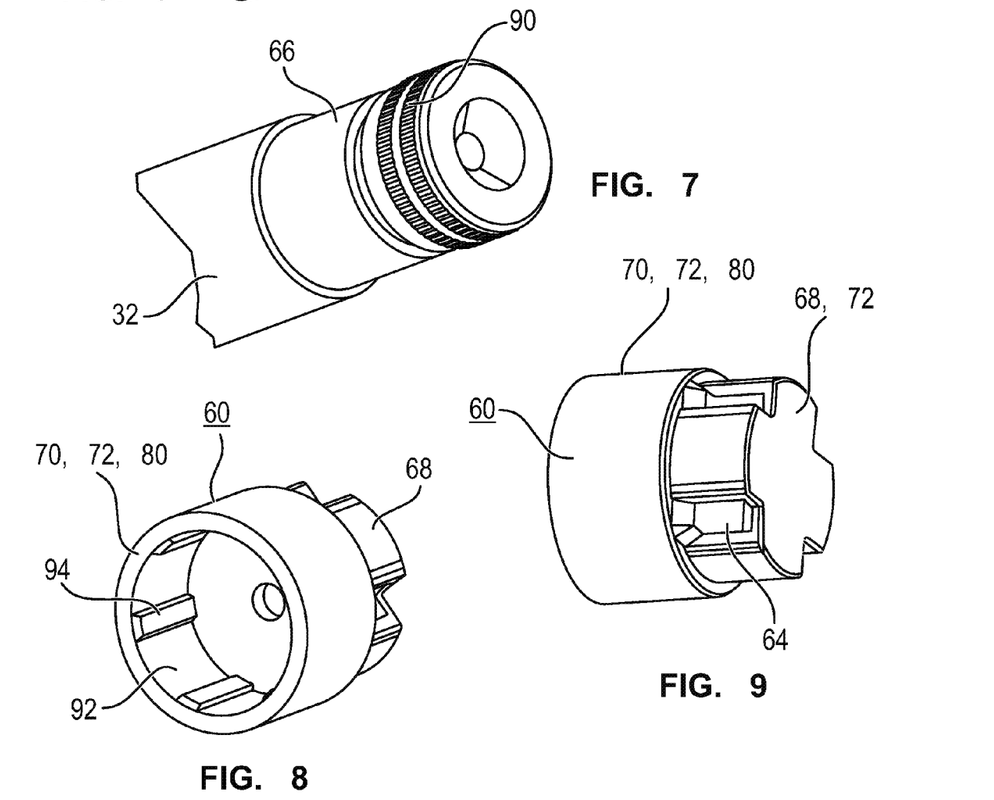
FIG. 7 shows in perspective, the shaft end of the motor shaft with knurling on the periphery.
FIGS. 8 and 9 show in perspective view, the sensor emitter as a push-on joint part with a view into and onto its joint shank configured as a joint sleeve.

While FIG. 7 shows the shaft end 66 of the rotor shaft 32, again provided with knurling 90, in FIGS. 8 and 9 the sensor emitter 60 is shown with a view into the joint sleeve 80 of the joint shank 70, and in FIG. 9 with a view onto the cross-shaped sensor head 68. The cross-shaped over-molding 72 of the magnetic dipole 64 leaves this free at the transitions to the cross shape of the emitter head 68.

Radial ribs 94 again are molded onto the inner wall 92 of the joint sleeve 80 of the joint shank 70. These deform during the joining process under hot pressing of the sensor emitter 60 to the knurling 90 of the shaft end 66, so that again a radial and axial form fit and a clearly centered positioning of the sensor emitter 60 is created in the joint connection to the shaft end 66.

Figure 10:
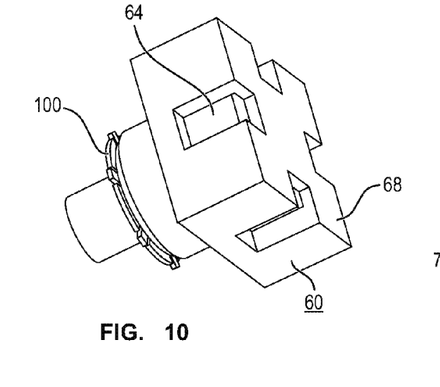
FIGS. 10 and 11 show in perspective view, the sensor emitter as a push-in joint part with two-stage joint shank and rectangular and round emitter head.
Figure 11:
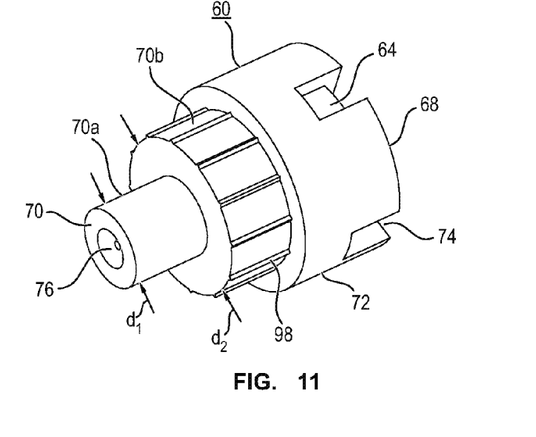

FIGS. 10 and 11 show a push-in variant of the sensor emitter 60 with an angular, here square, and with a round or cylindrical emitter head 68 respectively. In the two embodiments in FIGS. 10 and 11, the joint shank 70 has a step contour with a comparatively small outer diameter $d_1$ and with a comparatively large outer diameter $d_2$ of two axial shaft portions 70a and 70b respectively. Face side recesses 74, again in conjunction with a center axial opening 76, serve for holding the magnetic dipole 64 in the over-molding tool.

Figures 12, 13:
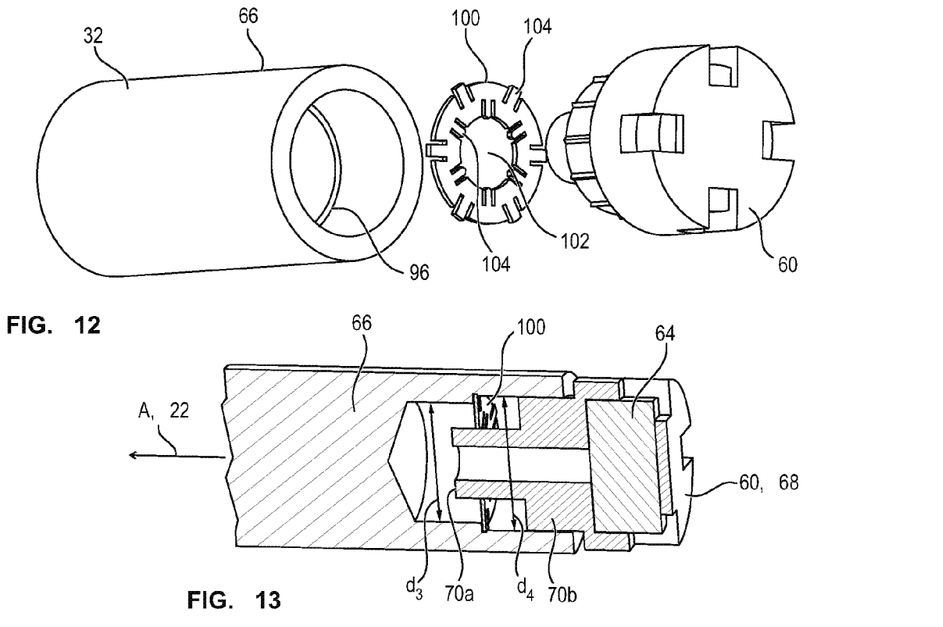
FIGS. 12 and 13 show in exploded perspective view and in longitudinal section, the shaft end with a stepped bore and the sensor emitter according to FIG. 11 including a ring disc.

According to FIGS. 12 and 13, which show the round embodiment of the emitter head 68 of the sensor emitter 60, the shaft end 66 has an axial stepped bore 96 with two different diameters $d_3$ and $d_4$ in the axial direction A, 22. The comparatively large inner diameter $d_4$ is dimensioned to form an interference fit of the shank portion 70b of the joint shank 70 of the sensor emitter 60 with the comparatively large outer diameter $d_2$. The axial form-fit joint connection, in particular secure against twisting, of the sensor emitter 60 is achieved firstly by the peripheral radial ribs 98 on the shank portion 70b with a comparatively large outer diameter $d_2$.

Also, in this embodiment preferably a ring disc is provided, designated below as a claw disc 100, which sits in the stepped bore 96 of the rotor shaft 32 at a stop, as evident from FIG. 13. This claw disc 100, formed for example as a metal ring, has deformable ribs or claws 104 on the opening edge of the central passage opening 102 and on the outer periphery. During the process of pressing the sensor emitter 60 with the plastic over-molding 72 into the stepped bore 96 on the shaft end side, the form-fit joint connection, including twist protection, is ensured firstly by the gripping of the ring disc 100 in the stepped bore 96 and secondly by a gripping of the plastic over-molding 72 in the ring disc 100.

Figure 14:
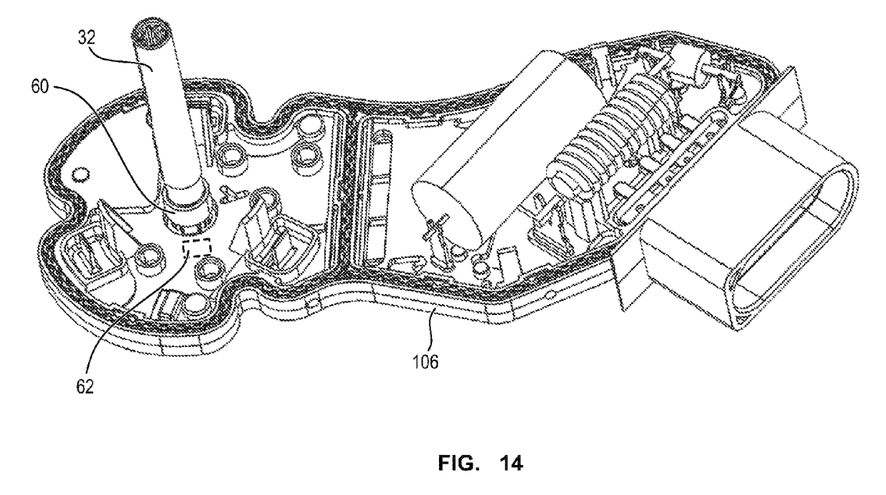
FIG. 14 shows in perspective view, an electronics housing shell of the gearbox actuator with rotor shaft running normally to the shell plane, including the sensor emitter joined on the shaft end side.

FIG. 14 shows an electronics housing shell 106 placed on the B-side bearing plate 26. As can be seen, the sensor emitter 60 joined to the rotor shaft 32 on the face end protrudes into this electronics housing shell 106, radially spaced from the stationary and rotationally fixed sensor unit 62. For reasons of greater clarity, the rotor shaft 32 is shown without rotor 34.

The invention is not restricted to the exemplary embodiments described above. Rather, other variants of the invention may be derived from these by the person skilled in the art, without leaving the subject of the invention. In particular, all individual features described in connection with the exemplary embodiments may also be combined in other ways without leaving the subject of the invention.

The following is a summary list of reference numerals and the corresponding structure used in the above description of the invention:

2 Drive train
4 Internal combustion engine
6 First shaft
8 Gearbox
10 Second shaft
12 Drive wheels
14 Electric motor
16 Gearbox actuator
18 Data line
20 Selector lever
22 Rotor axis
24 Housing
26 B-bearing plate
28 A-bearing plate
30 Bearing
32 Rotor shaft
34 Rotor
36 Rotor packet
38 Permanent magnet
40 Sheet packet
42 Stator
44 Air gap
46 Solenoid
47 Recess
48 Contact region
50 First portion
52 Second portion
54 First outer diameter
56 Second outer diameter
58 Position emitter 60 Sensor emitter
62 Sensor unit
64 Magnetic dipole
66 Shaft end
68 Emitter head
70 Joint shank
70a, b Shank portion
72 Plastic over-molding
74 Retaining structure/groove/bead
76 Retaining structure/opening/hole
78 Joint peg
80 Joint sleeve
82 Ring chamber
84 Radial rib
86 Shaft/axial bore
88 Bore edge
90 Knurling
92 Inner wall
94 Radial rib
96 Stepped bore
98 Radial rib
100 Claw/ring disc
102 Passage opening
104 Rib/claw
106 Electronics housing shell
A Axial direction
$d_{1,2}$ Outer diameter
$d_{3,4}$ Inner diameter

The invention claimed is:

1. An electrical machine, comprising:
a rotor rotatably mounted about a rotor shaft, said rotor shaft having a shaft end with a face side;
a position emitter with a rotationally fixed sensor unit and with a sensor emitter fixed relative to said rotor shaft;
said sensor emitter:
being an injection molding formed with an emitter head receiving a magnet and with a joint shank; or
being provided, together with the magnet on the emitter head side, with an plastic over-molding forming said joint shank; and
said joint shank being joined to said rotor shaft on said face side of said shaft end by form fit, forming a press fit or interference fit, and said joint shank on the emitter side including a joint sleeve which surrounds said shaft end in the form of a cap and which has a plurality of deformable radial lips on an inside thereof.

2. The electrical machine according to claim 1, wherein said magnet is a magnetic dipole.

3. The electrical machine according to claim 1, wherein said joint shank on a sensor side is formed with a step contour having a comparatively small and a comparatively large outer diameter, and said shaft end is formed with a stepped bore having at least two different inner diameters in the axial direction.

4. The electrical machine according to claim 3, wherein in the shank region with the comparatively large diameter, said joint shank is formed with deformable radial ribs on an outside thereof to produce the press fit or interference fit inside a corresponding shaft-side bore portion of said stepped bore.

5. The electrical machine according to claim 3, wherein said joint shank on the emitter side is inserted in said stepped bore secured against twisting by a ring disc that is formed with ribs and through which passes said shank region with the comparatively small outer diameter.

6. The electrical machine according to claim 1, wherein said joint shank on the emitter side includes a joint peg which is molded inside said joint sleeve forming a ring chamber and which sits in an axial bore of said rotor shaft on the shaft end side in the joint connection.

7. The electrical machine according to claim 6, wherein said joint peg has a periphery formed with deformable radial ribs extending into said ring chamber.

8. The electrical machine according to claim 1, wherein said shaft end of said rotor shaft has an outer periphery formed with a knurling.

9. The electrical machine according to claim 1, which comprises a holding structure for an over-molding tool disposed on a face side of said emitter head and/or on a free end side of said joint shank.

10. The electrical machine according to claim 1 configured as an electric motor of a motor vehicle.

11. A gearbox actuator of a motor vehicle, comprising an electrical machine according to claim 1.

* * * * *